(12) United States Patent
Rosenberger et al.

(10) Patent No.: US 12,113,226 B2
(45) Date of Patent: Oct. 8, 2024

(54) HOUSING FOR SECURING BATTERY CELLS IN A BATTERY MODULE

(71) Applicant: Caterpillar Inc., Peoria, IL (US)

(72) Inventors: Adam R. Rosenberger, Washington, IL (US); Brian R. Bell, West Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 174 days.

(21) Appl. No.: 17/246,151

(22) Filed: Apr. 30, 2021

(65) Prior Publication Data

US 2022/0352588 A1    Nov. 3, 2022

(51) Int. Cl.
| | |
|---|---|
| *H01M 50/209* | (2021.01) |
| *H01M 10/48* | (2006.01) |
| *H01M 10/613* | (2014.01) |
| *H01M 10/647* | (2014.01) |
| *H01M 10/6556* | (2014.01) |
| *H01M 50/244* | (2021.01) |
| *H01M 50/519* | (2021.01) |

(52) U.S. Cl.
CPC ......... *H01M 50/209* (2021.01); *H01M 10/48* (2013.01); *H01M 10/613* (2015.04); *H01M 10/647* (2015.04); *H01M 10/6556* (2015.04); *H01M 50/519* (2021.01); *H01M 2220/20* (2013.01)

(58) Field of Classification Search
None
See application file for complete search history.

(56) References Cited

U.S. PATENT DOCUMENTS

| | | | |
|---|---|---|---|
| 5,256,502 A | 10/1993 | Kump | |
| 5,308,718 A * | 5/1994 | Eidler | H01M 10/02 |
| | | | 429/70 |
| 8,512,889 B1 * | 8/2013 | Ahn | H01M 10/0413 |
| | | | 429/96 |
| 8,709,644 B2 | 4/2014 | Maguire et al. | |
| 9,200,428 B2 | 12/2015 | Miyatake | |
| 10,930,908 B2 | 2/2021 | Menig et al. | |
| 2012/0040226 A1 * | 2/2012 | Kim | H01M 50/264 |
| | | | 429/158 |

(Continued)

FOREIGN PATENT DOCUMENTS

| | | | |
|---|---|---|---|
| CN | 207818670 | * | 9/2018 |
| CN | 109103375 A | | 12/2018 |

(Continued)

OTHER PUBLICATIONS

International Search Report for Int'l. Patent Appln. No. GB2205661.8, mailed Oct. 19, 2022 (7 pgs).

*Primary Examiner* — Lisa S Park
(74) *Attorney, Agent, or Firm* — Lee & Hayes, PLLC

(57) ABSTRACT

A housing includes a first end plate defining a first end of the housing and a second end plate defining a second end of the housing opposite the first end. The housing also includes a first side plate coupled to the first end plate and the second end plate, thereby defining a first side of the housing, a second side plate coupled to the first end plate and the second end plate, thereby defining a second side of the housing opposite the first side, and a center plate coupled to the first end plate and the second end plate. The housing further includes a back plate coupled to the center plate.

25 Claims, 9 Drawing Sheets

(56) References Cited

U.S. PATENT DOCUMENTS

| | | | | |
|---|---|---|---|---|
| 2013/0273400 | A1 | 10/2013 | Musetti | |
| 2014/0302356 | A1* | 10/2014 | Tsuruta | H01M 10/0468 |
| | | | | 429/156 |
| 2015/0325818 | A1* | 11/2015 | Suzuki | H01M 50/264 |
| | | | | 429/186 |
| 2016/0043353 | A1* | 2/2016 | Tsutsumi | H01G 11/80 |
| | | | | 429/163 |
| 2016/0149180 | A1* | 5/2016 | Tokoo | H01M 50/224 |
| | | | | 429/154 |
| 2019/0221826 | A1* | 7/2019 | Hsu | H01M 50/296 |

FOREIGN PATENT DOCUMENTS

| | | | |
|---|---|---|---|
| CN | 210200830 | * | 3/2020 |
| CN | 111435760 | A | 7/2020 |
| CN | 113555649 | | 10/2021 |
| EP | 2418710 | | 2/2012 |
| EP | 3751632 | A1 | 12/2020 |
| WO | 2012165846 | A2 | 12/2012 |
| WO | WO2013020618 | * | 2/2013 |

* cited by examiner

HOUSING FOR SECURING BATTERY CELLS IN A BATTERY MODULE

TECHNICAL FIELD

The present disclosure relates to a housing for securing battery cells in a battery module. More specifically, the present disclosure relates to a housing for securing battery cells in a battery module together with housing components that support the battery cells such that the battery module is able to withstand relatively high vibration environments, and is stackable with other battery modules.

BACKGROUND

Battery modules are used in a variety of applications in order to provide and store energy. For example, battery modules are increasingly implemented in vehicles, equipment, and other machines. When implemented in mobile applications, battery modules are often stored such that the battery modules minimize impact on cabin space, storage space, or other space for needed for critical components of a machine. For example, in a passenger vehicle application, battery modules are often located on or under floorboards of a cabin of the vehicle. Such a location is ideal for storing battery modules as passenger vehicles often include a large area of floor space.

However, certain applications lack an ideal location on the machine where battery modules can be stored. For example, certain types of machines such as loaders, backhoes, graders, excavators, dump trucks, etc., often include a cab designed for a single operator and occasionally a single passenger. As such, these machines typically lack a large floorboard area where battery modules can be mounted. Furthermore, such machines often lack additional storage space for battery modules due to the various components associated with such machines. Still further, some machines operate on undeveloped work surfaces such as paving sites, quarries, mine sites, construction sites, or other harsh environments and, as such, experience relatively high levels of vibration and other forces when compared with passenger vehicles (or other vehicles implemented on roadways).

An example battery module housing is described in U.S. Pat. No. 9,200,428 (hereinafter referred to as the '428 reference). In particular, the '428 reference describes a battery module storage apparatus for securing battery cells. The '428 reference describes a battery module storage apparatus that provides a highly rigid structure for securing battery cells such that the battery module storage apparatus is capable of withstanding vibration and shock forces experienced on a power shovel. The apparatus described in the '428 reference includes a number of rigid plates configured to provide a highly rigid structure for the battery module. The '428 reference also describes the use of one or more intermediate plates attached to tie rods in order to increase a natural frequency of vibration in the battery module storage apparatus. However, due to these additional external support structures, the apparatus described in the '428 reference has a relatively large footprint. Additionally, due to the configurations of the rigid plates and other internal components, the available volume within the apparatus is not optimized. As a result, it may be undesirable, or not possible, to use the apparatus of the '428 reference in many applications.

Example embodiments of the present disclosure are directed toward overcoming the deficiencies described above.

SUMMARY

An example housing includes a first end plate defining a first end of the housing, the first end plate including a first opening disposed substantially centrally along a length of the first end plate, and a second end plate defining a second end of the housing opposite the first end, the second end plate including a second opening disposed substantially centrally along a length of the second end plate. The housing further includes a first side plate coupled to the first end plate and the second end plate, thereby defining a first side of the housing, the first side plate extending substantially perpendicular to the first end plate and the second end plate, and a second side plate coupled to the first end plate and the second end plate, thereby defining a second side of the housing opposite the first side, the second side plate extending substantially parallel to the first side plate. The housing also includes a center plate coupled to the first end plate and the second end plate, the center plate including a first end tab disposed at least partly within the first opening, a second end tab disposed at least partly within the second opening, and a substantially planar bottom surface. The housing includes a back plate extending substantially perpendicular to the center plate and including a third opening disposed substantially centrally along a length of the back plate, wherein at least portion of the bottom surface of the center plate is disposed within the third opening and is coupled to the back plate.

An example battery module includes a housing including a first end plate defining a first end of the housing, the first end plate including a first opening disposed along a length of the first end plate, and a second end plate defining a second end of the housing opposite the first end, the second end plate including a second opening disposed along a length of the second end plate. The housing further includes a first side plate coupled to the first end plate and the second end plate, thereby defining a first side of the housing, the first side plate extending substantially perpendicular to the first end plate and the second end plate, and a second side plate coupled to the first end plate and the second end plate, thereby defining a second side of the housing opposite the first side, the second side plate extending substantially parallel to the first side plate. The housing also includes a center plate coupled to the first end plate and the second end plate, the center plate including a first end tab disposed at least partly within the first opening, a second end tab disposed at least partly within the second opening, and a substantially planar bottom surface. The housing includes a back plate including a third opening disposed along a length of the back plate, wherein at least portion of the bottom surface of the center plate is disposed within the third opening and is coupled to the back plate. The battery module includes a plurality of battery cells secured within the housing, wherein individual battery cells of the plurality of battery cells are coupled to the center plate and coupled to at least the first side plate and the second side plate In a further example, a method includes providing a plurality of plates configured to form an exterior perimeter of a housing, the plurality of plates including at least a first end plate having a first opening therein and a second end plate having a second opening therein, and providing a center plate positioned to bisect the housing, thereby forming a first half and a second half of the housing, wherein the center plate includes a first end tab disposed at least partially within the first opening and a second end tab disposed at least partially within the second opening. The method also includes disposing a first plurality of battery cells within the first half of the housing, disposing a second plurality of battery cells within the second half of the housing, and compressing the housing such that a compressive force is exerted on the first end plate towards the second end plate. The method further includes coupling individual plates of the plurality of plates to each other, and coupling the center plate to the first end plate and the second end plate.

DETAILED DESCRIPTION

Figure 1:
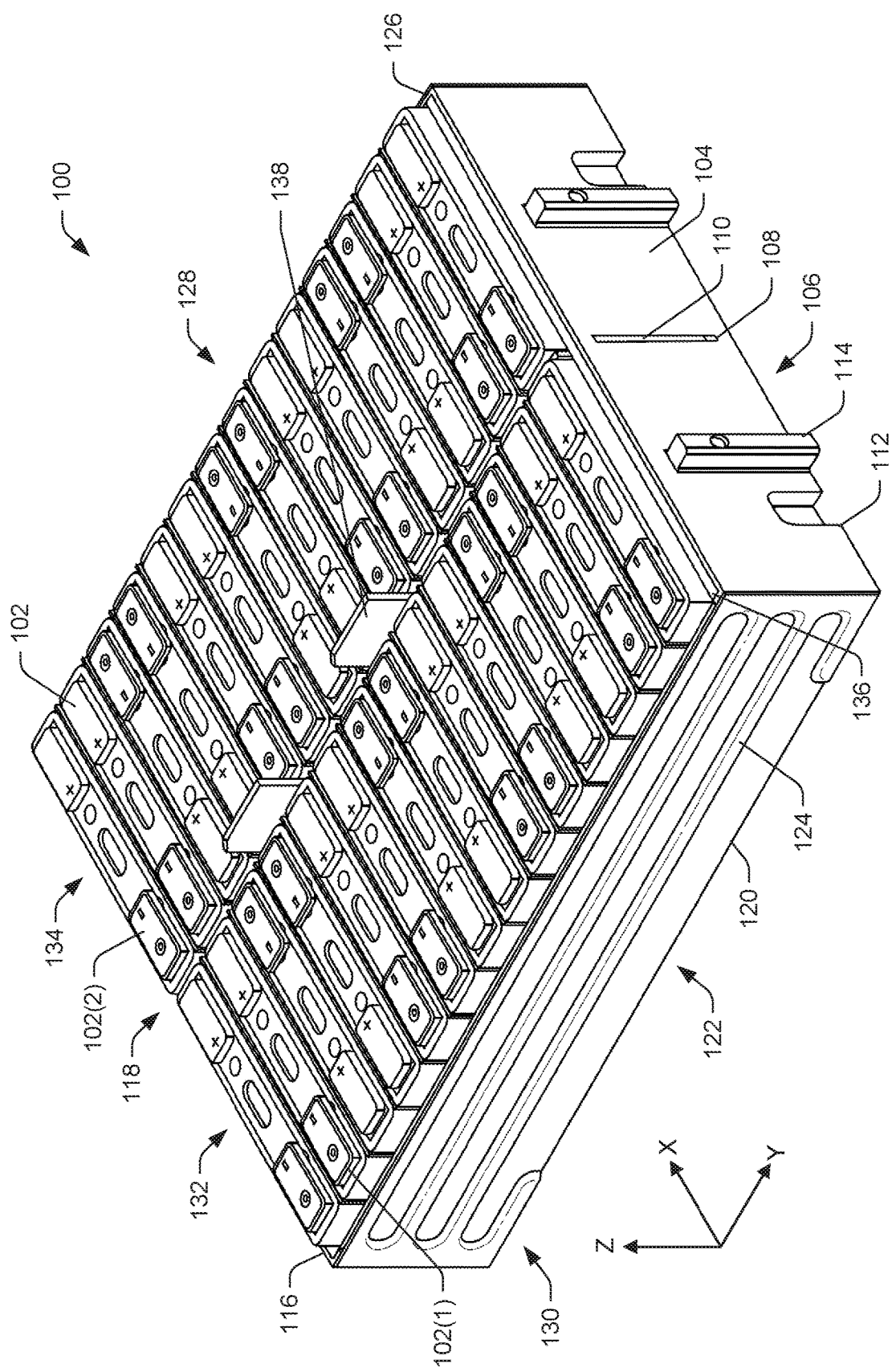
FIG. 1 is a perspective view of an example housing for a battery module having a plurality of battery cells secured within the housing in accordance with an example of the present disclosure.

FIG. 1 depicts a perspective view of an example housing 100. The housing 100 is used to secure a plurality of battery cells 102 therein. The battery cells 102 are electrically connected to one another in order to form a battery module (shown and described further with respect to FIGS. 4 and 5) that supplies electrical power to a machine to which the battery module is electrically coupled. In some examples, multiple battery modules, which include similar housings and battery cells, are electrically coupled to one another and the machine in order to provide a desired power output and voltage output for the machine. The battery cells 102 may include any capacity, voltage, energy, etc.

In some examples, the housing 100 includes a first end plate 104 that defines a first end 106 of the housing 100. The first end plate 104 may be made of aluminum, steel, or any other suitable material. The first end plate 104 includes a gap, aperture, opening, slit 108, or other such opening formed in a center thereof. The slit 108 may be shaped to receive at least a portion of a center plate 110 therein. In some examples, the slit 108 is centered along a length of the first end plate 104 such that the slit 108 is located in a middle of the first end plate 104. Furthermore, the slit 108 is oriented such that the slit 108 extends in a vertical direction (along the Z-direction shown in FIG. 1.) that is perpendicular to a length (extending in the X-direction shown in FIG. 1) of the slit 108. The slit 108 may be shaped such that a length of the slit 108 is less than a height of the first end plate 104.

In some examples, the first end plate 104 includes one or more cutouts 112 (or apertures). The cutouts 112 in the first end plate 104 may be shaped to accommodate terminals (or other components) that extend from within the housing 100 to one or more components outside of the housing 100. The first end plate 104 further includes one or more mounting portions 114. The mounting portions 114 may include substantially rectangular hollow protrusions that are coupled to and/or extend from the first end plate 104. In some examples, the housing 100 may be mounted to a secondary structure via the mounting portions 114. Additionally, and/or alternatively, a secondary housing (not shown) may be secured to the housing 100 via the mounting portions 114.

The housing 100 includes a second end plate 116 that defines a second end 118 of the housing 100 that is opposite the first end 106 of the housing. In some examples, the second end plate 106 is parallel to the first end plate 104. Furthermore, in some examples, the second end plate 116 and the first end plate 104 are identical components such that the second end plate 116 includes the same features as the first end plate 104. Furthermore, the second end plate 116 may be identical in size to the first end plate 104. In some examples, the second end plate 116 may be spaced apart from the first end plate 104 by a distance (e.g., in the Y-direction). The distance may determined based on a number of battery cells 102 that are accommodated between the first end plate 104 and the second end plate 106.

In some examples, the housing 100 also includes a first side plate 120. The first side plate 120 extends (e.g., in the Y-direction) from the first end plate 104 to the second end plate 116, thereby defining a first side 122 of the housing 100. The first side plate 120 is coupled to the first end plate 104 at the first end 106 of the housing 100, and is coupled to the second end plate 116 at the second end 118 of the housing 100, such that the first side plate 120 spans a distance between the first end plate 104 and the second end plate 116. The first side plate 120 may be made from aluminum, steel, or any other suitable material. In some examples, the material of the first side plate 120 is the same or substantially similar to the material of the first end plate 104 and the second end plate 116. Furthermore, the first side plate 120 includes corrugations 124 therein. The corrugations 124 in the first side plate 120 form alternate ridges and grooves in the first side plate 120. The corrugations 124 of the first side plate 120 may provide additional strength to the first side plate 120 such that the corrugations 124 provide increased resistance to loading forces imparted on the first side plate 120 and the second side plate 126

The housing 100 further includes a second side plate 126. The second side plate 126 extends (e.g., in the Y-direction) from the first end plate 104 to the second end plate 116, thereby defining a second side 128 of the housing. The second side plate 126 is coupled to the first end plate 104 at the first end 106 of the housing 100 and is coupled to the second end plate 116 at the second end 118 of the housing 100, such that the second side plate 126 spans a distance between the first end plate 104 and the second end plate 116. The second plate 126 may be substantially parallel to the first side plate 120. In some examples, the second end plate 126 and the first side plate 120 are identical components such that the second end plate 126 includes the same features as the first side plate 120. Furthermore, the second end plate 126 may be identical in size to the first side plate 120.

In some examples, the first end plate 104, the second end plate 116, the first side plate 120, and the second side plate 128 are coupled to one another such that the first end plate 104, the second end plate 116, the first side plate 120, and the second side plate 128 define an exterior perimeter 130 of the housing 100. Additionally, the first end plate 104, the second end plate 116, the first side plate 120, and the second side plate 128 each include a substantially equal height (i.e., the dimension of each component in the Z-direction). Furthermore, in some examples, the first end plate 104, the second end plate 116, the first side plate 120, and the second side plate 128 are welded to one another in order to eliminate the need for fasteners, thereby eliminating clearance requirements for the fasteners and tools to adjust the fasteners. As such, the housing 100 described herein maximizes space available for storing battery cells 102 therein, while minimizing space that may be taken up by fasteners, or other coupling devices.

As mentioned previously, the housing 100 further includes a center plate 110. The center plate may be made from aluminum, steel, or any other suitable material. The center plate 110 extends (e.g., in the Y-direction) between the first end plate 104 and the second end plate 116, and is parallel to the first side plate 120 and the second side plate 126. In some examples, the center plate 110 bisects the exterior perimeter 130 of the housing 100, thereby forming two equal halves of the housing 100 such that the center plate 110 forms a first housing section 132 and a second housing section 134. The first housing section 132 and the second housing section 134 may include a substantially similar area. In some examples, one or more battery cells 102 are secured within the first housing section 132 and one or more battery cells are secured within the second housing section 134 such that a plurality of battery cells 102 are secured within the housing 100. In some examples, an equal number of battery cells 102 are secured within the first housing section 132 and the second housing section 134. For example, 14 battery cells 102 may be secured within the first housing section 132 and 14 battery cells may be secured within the second housing section 134. However, the housing 100 is not limited to securing 28 battery cells, but may house between 4 and 60 battery cells 102 therein. In still further examples, the housing 100 can be configured to store greater than or less than the number of battery cells 102 described above.

The center plate 110 may include end tabs (shown and described with respect to FIG. 3) that are at least partially inserted into the slits 108 in the first end plate 104 and the second end plate 116. Once inserted into the slits 108, the end tabs of the center plate 110 are coupled to the first end plate 104 and the second end plate 116. For example, the end tabs may be welded or otherwise coupled to the first end plate 104 and the second end plate 116. By coupling the center plate 110 to the first end plate 104 and the second end plate 116, the center plate 110 strengthens the housing 100 such that the housing 100 is able to withstand loading forces (e.g., vibration, shock, acceleration/deceleration, etc.) without the housing 100 deforming under such loading forces. In some examples, the forces imparted on the housing 100 during operation of the machine may reach levels of approximately 5-10 G. Typical passenger vehicles may experience forces between 1-2 G. Therefore, the center plate 110 and the housing 100 described herein provide a housing 100 that is significantly more robust when compared to other solutions. In some examples, the housing 100 may experience forces imparted on the housing 100 from any direction (i.e., X, Y, or Z-directions in FIG. 1 and/or a combination thereof).

The housing 100 may further include compressible material 136 that is inserted between various components. The compressible material 136 may be made of foam, plastic, rubber, polymer, or any other suitable compressible non-conductive material. For example, the compressible material 136 may be disposed between individual battery cells of the battery cells 102 in the housing 100. Additionally, compressible material 136 may disposed between two or more of the battery cells 102 and the center plate 110, between two or more of the battery cells 102 in the first housing section 132 and the first side plate 120, between two or more of the battery cells 102 in the second housing section 134 and the second side plate 126, between the battery cells 102 and the first end plate 104, and/or between the battery cells 102 and the second end plate 116.

The compressible material 136 of the housing 100 may be at least partially compressed during a process of forming the housing 100. For example, the housing 100 may be compressed prior to welding the various components to each other. The compression and the compressible material 136 creates a secure, tight fit for the battery cells 102 to be secured within the housing 100 without using fasteners. For example, the sides of the housing 100 are placed under a compressive load with the battery cells 102 and the compressible material 136 installed, such that the battery cells 102 and the compressible material 136 are compressed. The plates (e.g., end plates 104 and 116, side plates 120 and 126, and center plate 110) of the housing 100 are then coupled (e.g., welded) together while under a compressive load such that the battery cells 102 and the compressible material 136 remain under a compressive load (applied by the coupled plates) after the compressive load is removed. The compressive load applied by the coupled plates secure the battery cells 102 within the housing 100. In some examples, the compressive load applied to the plates may be a force between approximately 0.5 kN and approximately 9 kN, between approximately 1.5 kN and approximately 7.5 kN, or between approximately 2 kN and approximately 6 kN. Furthermore, once the compressive load is removed from the plates after the plates are coupled together, the battery cells 102 and the compressible material 136 may remain under a compressive load applied by the coupled plates. Such a compressive load applied by the plate may likewise be between approximately 0.5 kN and approximately 9 kN, between approximately 1.5 kN and approximately 7.5 kN, or between approximately 2 kN and approximately 6 kN. Furthermore, the compressible material 136 allows the battery cells 102 to expand over the life of the battery cells 102. For example, the compressible material 136 provides a tight fit for the battery cells 102, but also provides room for expansion as the battery cells 102 expand with use.

In some examples, the battery cells 102 may be individually coupled to the center plate 110. For example, and as described above, the compressible material 136 may be coupled to a battery cell 102 via an adhesive. The battery cell 102, having the compressible material 136 adhered thereto, is then coupled to the center plate 110 via an adhesive. For example, an adhesive is applied to the compressible material 136 that is coupled to the battery cell 102 and/or the adhesive is applied to the center plate 110 and the battery cell 102 having the compressible material 136 coupled thereto is then placed in contact with the center plate 110. By coupling the battery cells 102 to the center plate 110, a load path of the battery cells 102 is directed through the center plate 110 of the housing 100. Furthermore, the battery cells 102 may also be coupled to the first end plate 104 and the second end plate 116 (collectively "end plates 104 and 116") and the first side plate 120 and the second side plate 126 (collectively "side plates 120 and 126). Similarly, the battery cells 102 are coupled the first end plate 104 and the second end plate 116 via the compressible material 136 and the adhesive. For example, a single battery cell, such as battery cell 102(1) may be coupled to the first side plate 120 and the center plate 110. As such, the first side plate 120 and the center plate 110 may each support the battery cell 102(1) as the battery cell 102(1) experiences various forces due to acceleration/deceleration (or other forces). Similarly, battery cell 102(2) is coupled to the center plate 110, the second end plate 116, and the second side plate 126. As such, the battery cells 102 are supported by multiple components of the housing 100. Thus, the housing 100 is capable of supporting a plurality of battery cells 102 within the housing 100 even as the housing 100 and battery cells 102 experience various forces during operation of the machine.

Furthermore, the center plate 110 may include tabs 138 extending from a top side of the center plate 110. The tabs 138 may be sized such that the tabs 138 extend above a height of the end plates 104 and 116, the side plates 120 and 126, and the battery cells 102. In some examples, a cover (shown and described with respect to FIG. 5) is placed on the battery modules and the tabs 138 may provide a stop for a cover if a downward force is exerted on the cover. In some examples, multiple battery modules may be stacked on top of one another. As such, the tabs 138 may prevent the housing 100 and the battery cells 102 from being crushed by other battery modules and thereby, preventing the battery module from being shorted or otherwise damaged.

The housing 100 described herein provides a reinforced structure capable of supporting battery cells 102 in various implementations such that the housing 100 and battery modules 102 are able to withstand various loading forces experienced during operation of a machine. For example, by coupling the battery cells 102 to the center plate 110, the center plate 110 supports the battery cells 102 and prevents sagging (or other deformation) of the housing 100. As such, the housing 100 and battery cells 102 are able to withstand various load forces without damaging the housing 100 or the battery cells 102.

Figure 2:
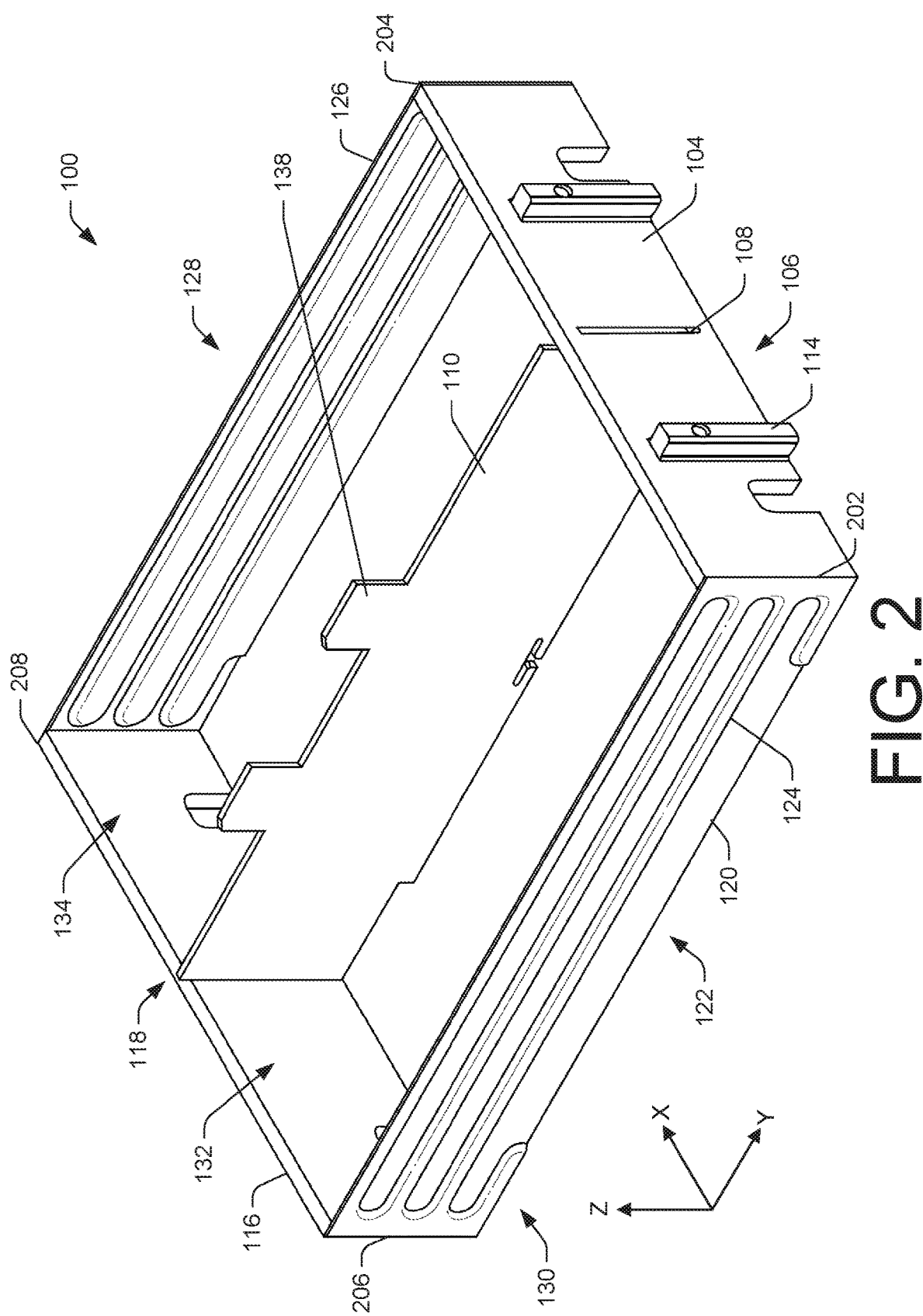
FIG. 2 is a perspective view of an example housing for a battery module in accordance with an example of the present disclosure.

FIG. 2 illustrates a perspective view of the housing 100 with the battery cells 102 removed from the housing 100. As described previously, the housing 100 includes the first end plate 104, the second end plate 116, the first side plate 120, and the second side plate 126 that are coupled to one another via welding. For example, the first end plate 104 and the first side plate 120 are welded to each other at a first corner 202 of the housing, and the first end plate 104 and the second side plate 126 are welded to each other at a second corner 204 of the housing 100. Furthermore, the second end plate 116 and the first side plate 120 are welded to each other at a third corner 206 of the housing, and the second end plate 116 and the second side plate 126 are welded to each other at a fourth corner 208 of the housing 100.

The housing 100 further includes the center plate 110 coupled to the first end plate 104 and the second end plate 116 such that the center plate 110 bisects the exterior perimeter of the housing 100. For example, the center plate 110 includes end tabs that are inserted though the slit 108 in the first end plate 104 at the first end 106 of the housing 100 and through a slit 108 in the second end plate 116 at the second end 118 of the housing 100. Once the end tabs of the center plate 110 are inserted into the slits 108, the end tabs are welded to the end plates 104 and 116, securing the center plate 110 to the end plates 104 and 116. As such, the center plate 110 forms a first housing section 132 and a second housing section 134 configured to store one or more battery cells, respectively. By coupling the various components of the housing 100 together without fasteners, space in the housing 100 is maximized for storing battery cells 102 with little to no space necessary for fasteners.

Figure 3:
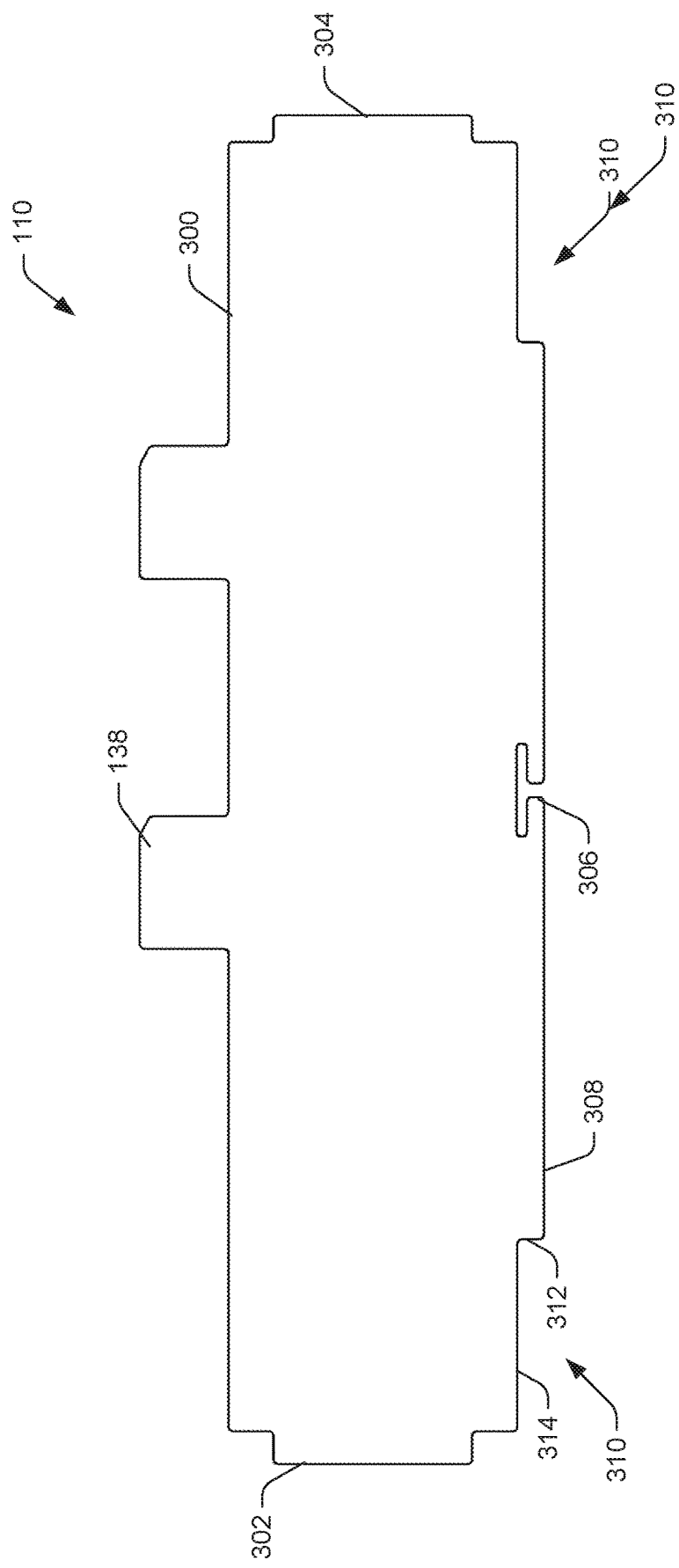
FIG. 3 is a side view of an example center plate of a housing for a battery module in accordance with an example of the present disclosure.

FIG. 3 depicts a side view of the center plate 110 of the housing 100. As described previously, the center plate 110 includes tabs 138 extending from a top side of the center plate 110. For example, the center plate 110 include a substantially planar top surface 300. The tabs 138 may extend vertically from the top surface 300 of the center plate 110. While showing two tabs 138 extending from the top surface 300 of the central plate 110, the central plate 110 may include fewer than or more than two tabs 138. The tabs 138 may prevent the housing 100 and the battery cells 102 from being crushed and thereby, preventing the battery module from being shorted or otherwise damaged. Thus, the tabs 138 may prevent the housing 100 and the battery cells 102 from being crushed if one or more additional housings and battery cells are stacked thereon.

The center plate 110 further includes a first end tab 302 and a second end tab 304. The first end tab 302 is shaped to be inserted into the slit 108 of the first end plate 104 and the second end tab 304 is shaped to be inserted into the slit 108 of the second end plate 116. The center plate 110 further includes an attachment portion 306. The attachment portion 306 is a notch or cutout formed proximate a bottom surface 308 of the center plate 110. The attachment portion 306 is configured to receive a clip (shown and described in FIG. 6) that secures a cooling plate to the center plate 110 and the housing 100. For example, the attachment portion 306 may be shaped to correspond with a portion of the clip such that the clip securable to the center plate 110 while simultaneously securing the cooling plate to the center plate 110

In some examples, the center plate 110 further includes a substantially planar bottom surface 308. In some examples, the bottom surface 308 of the center plate 110 includes a notch 310 at either end of the center plate 110. The notch 310 includes a first surface 312 that extends perpendicularly to the bottom surface 308 and a second surface 314 that extends perpendicularly to the first surface 312 such that the second surface 314 is parallel to the bottom surface 308. The notches 310 may be sized and positioned such that at least a portion of a bottom surface 308 of the center plate 110 is insertable into the cooling plate.

The specific shape and configuration of the center plate 110 enables the center plate 110 be coupled to other components of the housing 100 without requiring the use of fasteners that may decrease available space within the housing 100 for storing battery cells 102, while providing additional structural support to the housing 100. Furthermore, as described previously, the center plate 110 provides an attachment portion 306, via which, other components may be attached to the housing 100 without requiring the use of fasteners. Furthermore, the end tabs 302 and 304 of the center plate 110 allow the center plate 110 to be at least partially inserted through the end plate 104 and 116 and coupled thereto. As such, the center plate 110 provides a rigid center member of the housing 100, thereby strengthening the housing 100.

Figure 4:
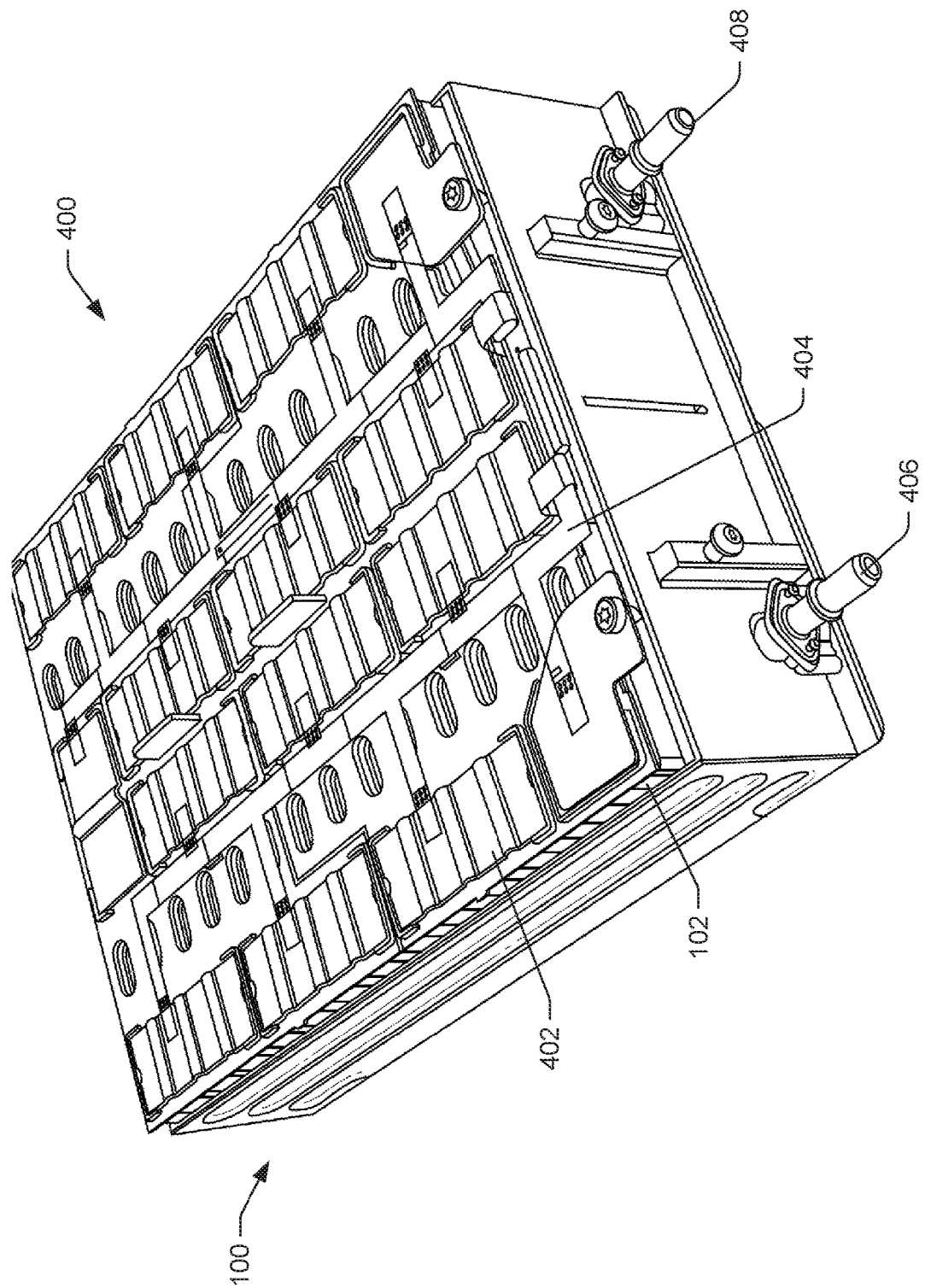
FIG. 4 is a perspective view of an example battery module in accordance with an example of the present disclosure.

FIG. 4 depicts a perspective view of a battery module 400 that is secured by the housing 100. The battery module 400 includes one or more busbars 402 that contact and connect terminals on the battery cells 102. The busbars 402 are formed from a conductive material, such as a metal, and are coupled or otherwise disposed in electrical connection with terminals on the battery cells 102. In some examples, the busbars 402 electrically connect the battery cells 102 to one another in series. Connected to the busbars 402 are one or more flexible circuits 404 (or "flex circuits 404") that are configured to measure current across the battery module 400. The flex circuits 404 include a thin insulating polymer film that includes conductive circuit patterns coupled thereto. Furthermore, the flex circuits 404 are coupled to the busbars 402 (via soldering or other conductive material) such that the flex circuits 404 are electrically connected to the busbars 402. The battery module further includes a positive terminal 406 and a negative terminal 408 (collectively "the terminals 406 and 408"). The terminals 406 and 408 are electrically connected to the battery cells 102 and/or the flex circuits 404 and protrude from the housing 100 via the cutouts 112 described with respect to FIG. 1. The terminals 406 and 408 provide electrical contacts configured to connect the battery module 400 to other battery modules, a motor, control circuitry, or other components of the machine.

Figure 5:
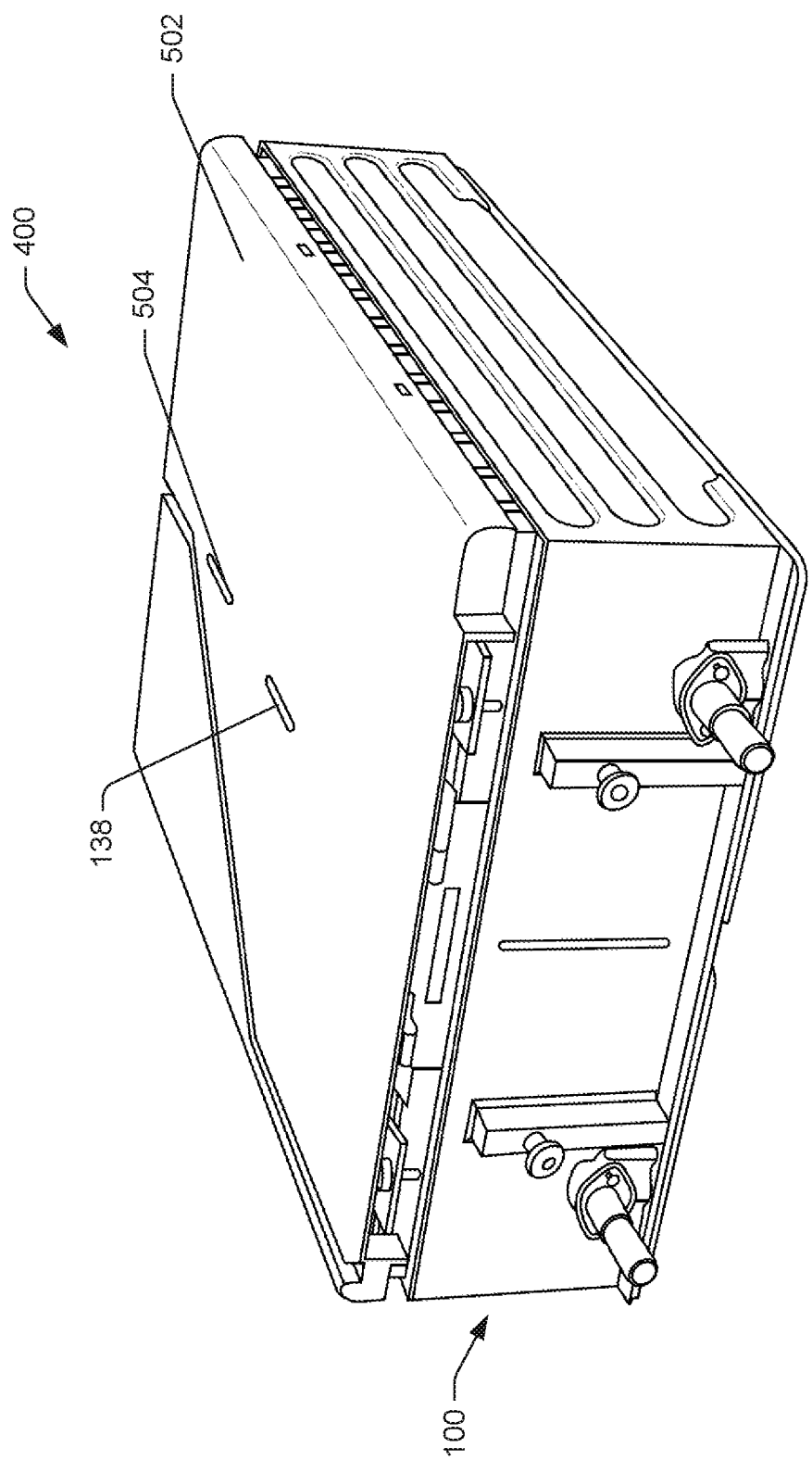
FIG. 5 is a perspective view of an example battery module in accordance with an example of the present disclosure.

FIG. 5 depicts a perspective view of the battery module 400 including a cover 502. In some examples, the cover 502 is shaped to correspond with the exterior perimeter of the housing 100 such that the cover 502 covers the housing 100 and the battery cells 102 when placed on the battery cells 102. The cover 502 may be made from a non-conductive material such as plastic, rubber, polymer, or any other suitable non-conductive material. As mentioned previously, the center plate 110 of the housing 100 includes tabs 138 extending from a top portion of the center plate 110. The cover 502 includes apertures 504 therein and the tabs 138 are configured to correspond with the apertures 504 in the cover 502 such that the tabs 138 extend at least partially above a top surface of the cover 502. As such, the tabs 138 prevent and/or reduce deformation of the cover 502 if the cover 502 is subject to downward forces. The cover 502 and the tabs 138 may prevent the battery module 400 from shorting or from other types of damage due to crushing.

Figure 6:
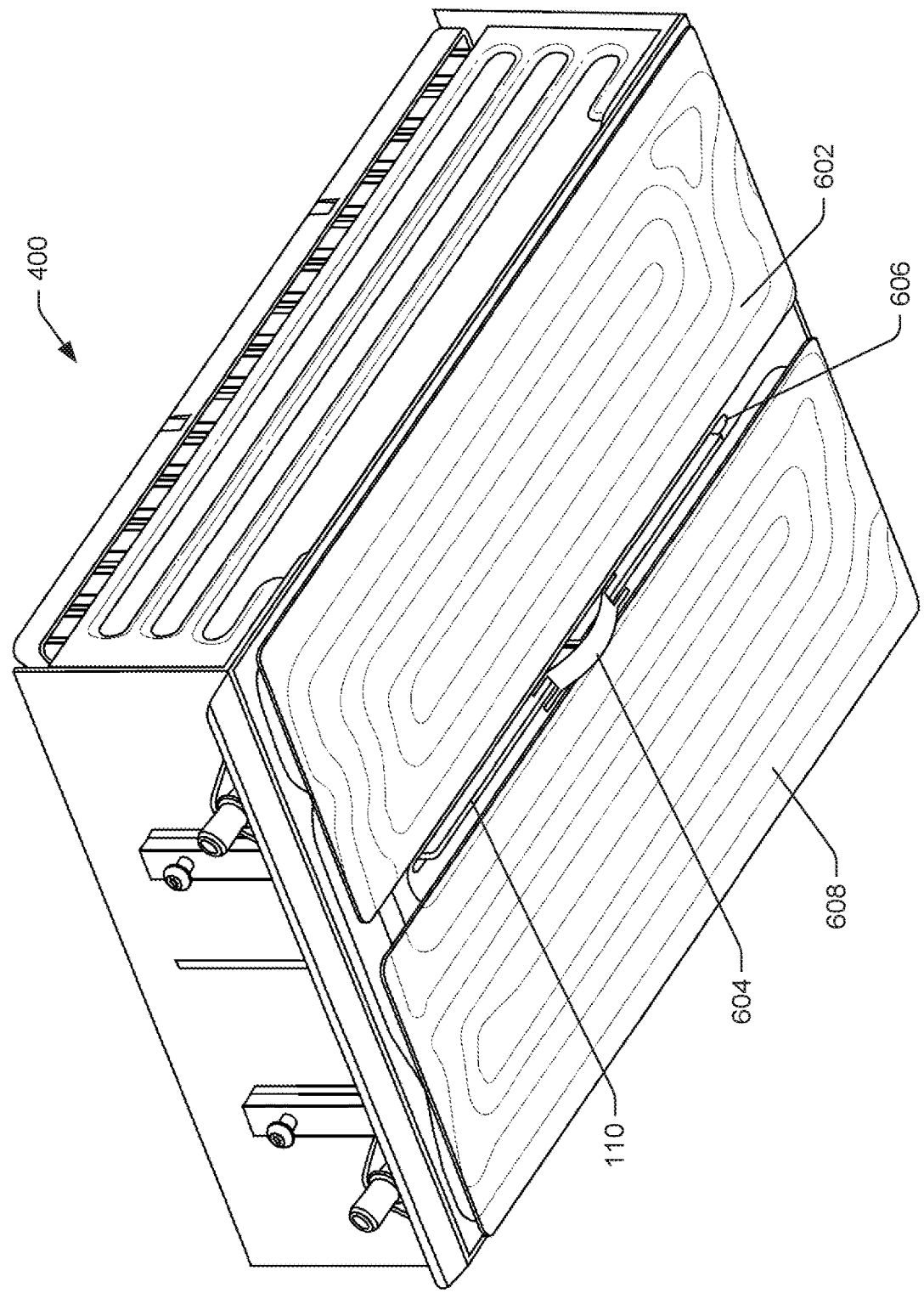
FIG. 6 is a bottom perspective view of an example cooling plate of a battery module in accordance with an example of the present disclosure.

FIG. 6 depicts a bottom perspective of the battery module 400. As shown in FIG. 6, the battery module 400 includes a back plate 602 attached to a bottom surface of the battery module 400. In some examples, the back plate 602 is a heat transfer plate and/or cooling plate. The back plate 602 is secured to the bottom surface of the battery module 400 by securing the back plate 602 to the attachment portion 306 of the center plate 110. The back plate 602 is shaped such that, when the back plate 602 is coupled to the housing 100, the back plate 602 contacts at least a portion of the first endplate 104, the second end plate 116, the first side plate 120, the second side plate 126, and the center plate 110. In some examples, the back plate 602 is secured to the center plate 110 by a clip 604. Furthermore, the back plate 602 includes an opening 606 that is configured to receive at least a portion of the center plate 110 such that a portion of the center plate 110 is inserted in the opening 606 of the back plate 602. For example, the bottom surface 308 and the notches 310 in the center plate 110 are shaped such that the bottom surface 308 of the center plate 110 is insertable into the opening 606 in the back plate 602. In some examples, the opening 606 in the back plate 602 is disposed substantially centrally along a length of the back plate 602. The clip 604 corresponds with and mates with the the attachment portion 306 of the center plate 110 to secure the clip 604 and the back plate 602 to the housing 100. In some examples, the back plate 602 comprises a metal plate having one or more channels 608 (or corrugations) therein. The channels 608 in the back plate 602 provide additional surface area such that the back plate 602 is able to draw heat from the battery cells 102 in the housing 100 and to transfer heat from the housing 100 to an environment (e.g., ambient air) surrounding the housing 100.

Figure 7:
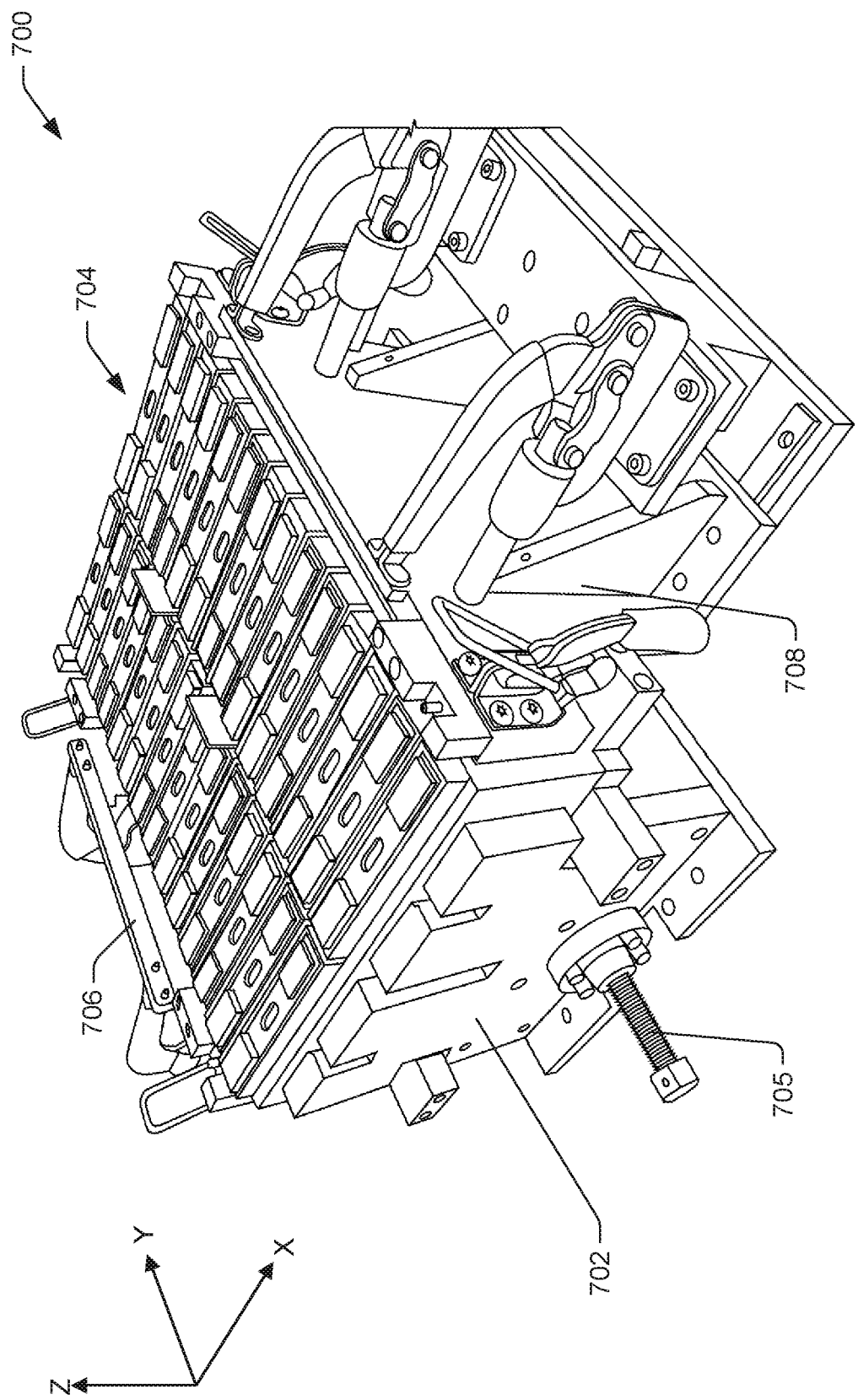
FIG. 7 is a perspective view of an example welding fixture used to construct a housing for a battery module in accordance with the present disclosure.

FIG. 7 depicts an example welding fixture 700. In some examples, the welding fixture 700 is configured to compress the battery module 400 prior to welding the end plates 104 and 116, the side plates 120 and 126, and the center plate 110. For example, each plate may be placed inside the welding fixture 700. Once each plate is placed in the welding fixture, the battery cells 102 and compressible material 136 may be placed within the welding fixture 700. In some examples, adhesive is applied to the various components of the housing 100 that require adhesive, such as the compressible material 136, battery cells 102, end plates 104 and 116, and side plates 120 and 126. The adhesive may include a cure time that allows the components to be coupled to one another before the adhesive cures.

In some examples, the housing 100 is compressed by the welding fixture 700 in the Y-direction prior to welding the plates to each other. As shown in FIG. 7, the welding fixture 700 includes at least two compression plates 702 and 704 that are drawn towards each other in the Y-direction in order to compress the housing 100 and battery cells 102. In some examples, the compression plates 702 and 704 are mounted on a rotatable shaft 705 having threading that, when rotated, draws the compression plates 702 and 704 towards each other. Compressing the housing components and the battery cells 102 prior to welding ensures that the battery cells 102 are tightly and securely fixed within the housing 100. In some examples, the welding fixture 700 includes at least two support plates 706 and 708 that secure the housing 100 in the X-direction, but may not be moveable to compress the housing 100 in the X-direction. Alternatively, in some examples, the housing 100 may be compressed in both the X and Y-directions prior to welding.

By coupling the various components of the housing 100 under compression, the housing 100 is formed securing the battery cells 102 without requiring fasteners, thereby maximizing useable space within the housing 100. Furthermore, the housing 100 is capable of withstanding various loading forces, due to the strength of the housing 100 and its configuration.

Figure 8:
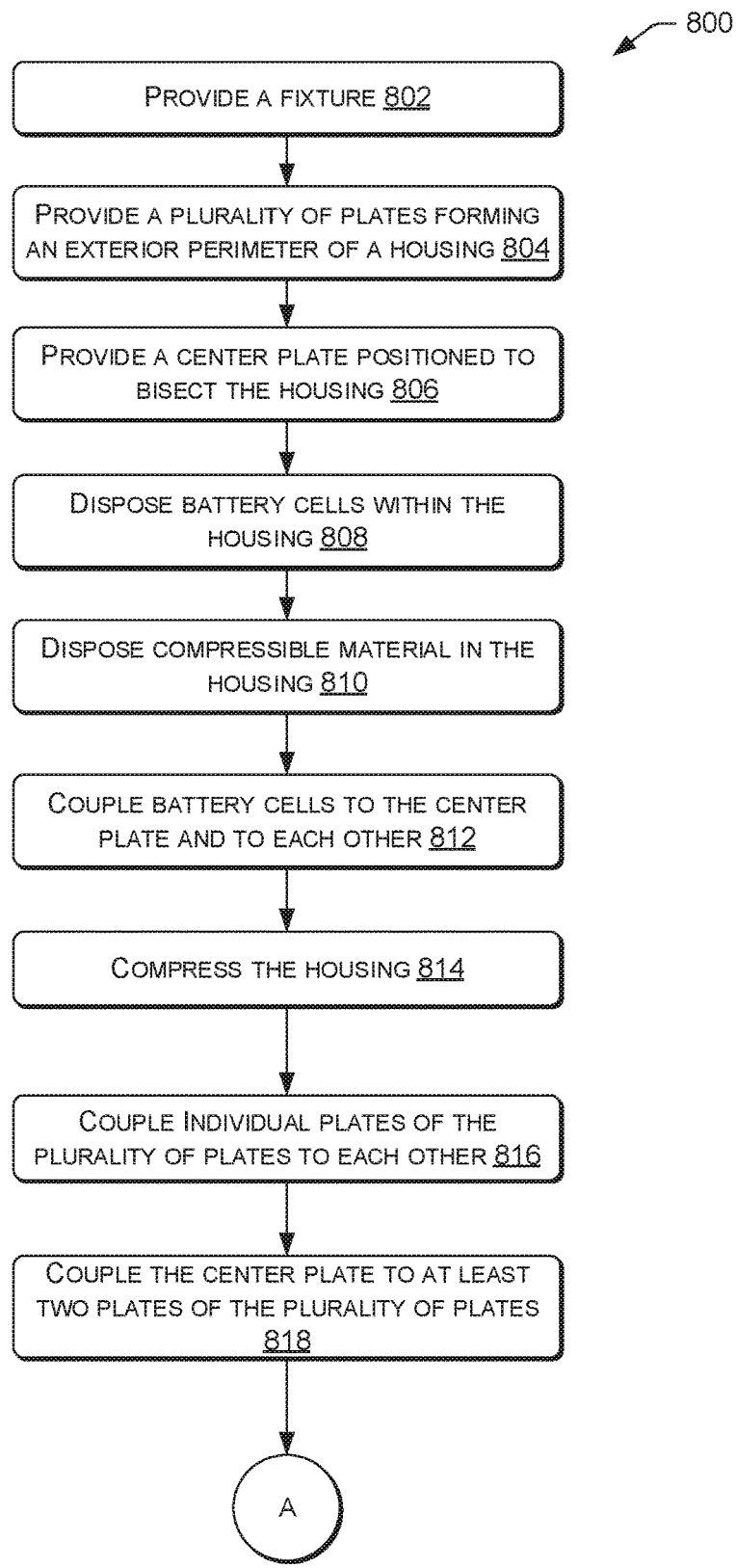
FIG. 8 is a flowchart illustrating a method of forming a housing for a battery module in accordance with an example of the present disclosure.

FIG. 8 is a flowchart illustrating a method 800 of forming a housing 100 for a battery module 400. The method 800 may be performed by one or more human users. Additionally, and/or alternatively, one or more steps of the method 800 may be performed automatically without human intervention. The method 800 may include different and/or additions steps, or perform steps in a different order than described herein.

The method 800 includes providing a fixture, at 802. The fixture is used to hold various components of a housing 100 while the housing 100 is formed. In some examples, the fixture includes an adjustable welding fixture 700 that includes moveable plates to be able to compress the housing 100 while the housing is formed. Additionally, and/or alternatively, the fixture may be any fixture that maintains a position of the components of the housing 100 as the housing is formed.

The method 800 includes providing a plurality of plates that form an exterior perimeter 130 of the housing 100, at 804. For example, the first end plate 104 and the second end plate 116 are position in the fixture at a first end 106 and a second end 118 of the housing 100, respectively. Likewise, the first side plate 120 and the second side plate 126 are positioned in the fixture at a first side 122 and a second side 128 of the housing 100, respectively. Thus, the plurality of plates are arranged within the fixture to form the exterior perimeter 130 of the housing.

The method 800 includes providing a center plate 110 positioned to bisect the housing 100, at 806. During step 806, the end tabs 302 and 304 of the center plate 110 may be inserted into the slits 108 in corresponding end plates 104 and 116. Once the center plate 110 is positioned in the housing 100, the center plate 110 creates first housing portion 132 and a second housing portion 134.

The method 800 includes disposing a plurality of battery cells 102 within the housing 100, at 808. In some examples, a first plurality of battery cells 102 are disposed within the first housing portion 132 of the housing 100, while a second plurality of battery cells 102 are disposed within the second housing portion 134 of the housing 100.

The method 800 includes disposing a compressible material in the housing 100, at 810. For example, compressible material 136 may be inserted between individual battery cells 102. Furthermore, the compressible material 136 may be disposed between the battery cells 102 and the end plates 104 and 116 and side plates 120 and 126. As mentioned previously, the compressible material 136 ensures that the battery cells 102 fit securely within the housing 100, while also providing room for the battery cells 102 to expand over the useful life of the battery cells 102.

The method 800 further includes coupling the battery cells 102 to the center plate 110 and to each other, at 812. In some examples, coupling the battery cells 102 to the center plate 110 and to each other includes applying an adhesive to the battery cells 102, the compressible material 136, the center plate, the end plates 104 and 116, and the side plates 120 and 126. For example, adhesive may be applied between the battery cell 102 and the compressible material 136, and between the compressible material 136 and one or more of the center plate, the end plates 104 and 116, and the side plates 120 and 126. As such, the battery cells 102 are secured to the structural components of the housing (i.e., the various plates) via the adhesive and compressible material 136.

The method 800 further includes compressing the housing 100, at 814. In some examples, compressing the housing 100 may include adjusting a position of the compression plates 702 and 704 of the welding fixture 700, such that the compression plates 702 and 704 apply a compressive load on the first end plate 104 towards the second end plate 116. As mentioned previously, the compressive load applied to the housing 100 by the compression plates 702 and 704 may include a force between approximately 0.5 kN and approximately 9 kN, between approximately 1.5 kN and approximately 7.5 kN, or between approximately 2 kN and approximately 6 kN. In some examples, the compression plates 702 and 704 are mounted on a rotatable shaft 705 having threading that, when rotated, draws the compression plates 702 and 704 towards each other. The shaft 705 may be rotated manually or the shaft may be rotated automatically via an electric motor.

The method 800 further includes coupling individual plates to each other, at 816. For example, the first end plate 104 and the first side plate 120 are welded to each other at a first corner 202 of the housing, and the first end plate 104 and the second side plate 126 are welded to each other at a second corner 204 of the housing 100. Furthermore, the second end plate 116 and the first side plate 120 are welded to each other at a third corner 206 of the housing, and the second end plate 116 and the second side plate 126 are welded to each other at a fourth corner 208 of the housing 100.

The method 800 further includes coupling the center plate 110 to at least two plates of the plurality of plates, at 818. As mentioned previously, the center plate 110 is positioned such that the end tabs 302 and 304 of the center plate are at least partially inserted in the slits 108 in the first end plate 104 and the second end plate 116. Once inserted into the slits, the end tabs 302 and 304 of the center plate 110 are welded to the first end plate 104 and the second end plate 116, respectively.

Figure 9:
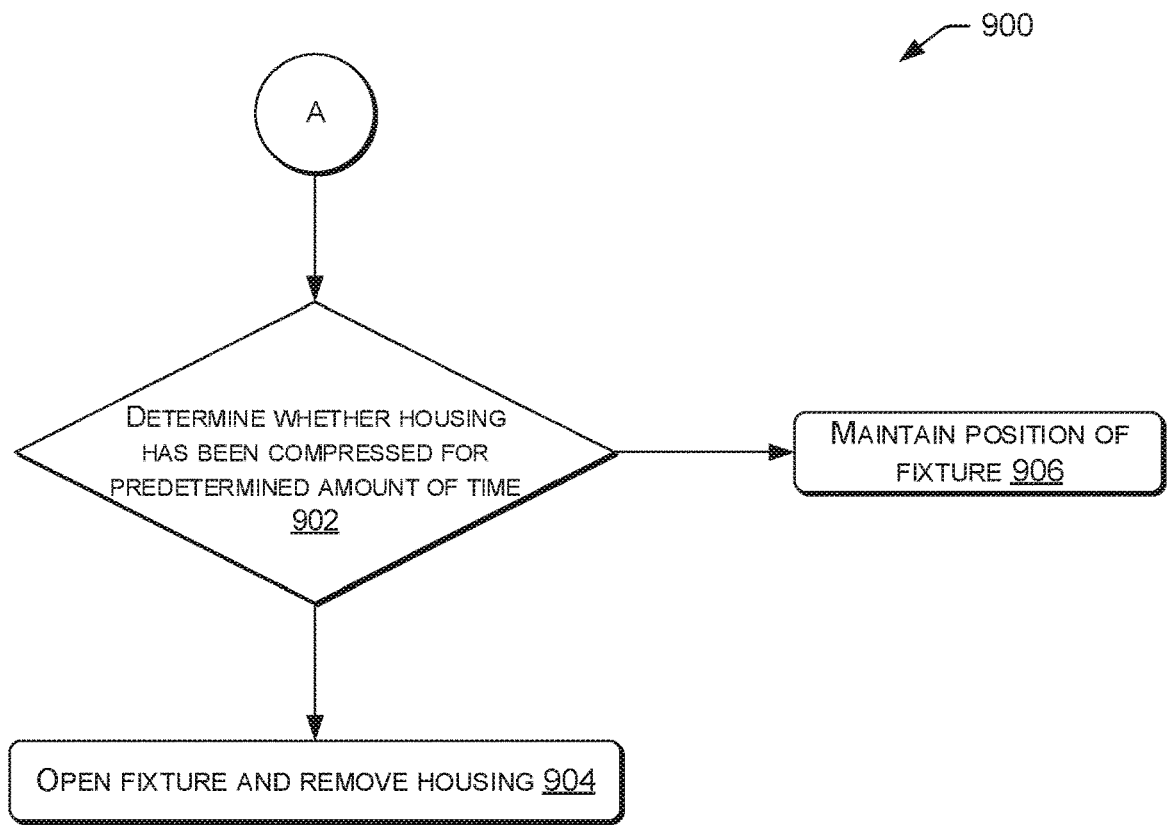
FIG. 9 is a continuation of the flowchart shown in FIG. 8 and associated with the example method of forming the housing for the battery module.

The flow diagram 900 in FIG. 9 continues the illustration of the method 800. The method 900 further includes determining whether the housing 100 has been compressed for a predetermined amount of time, at 902. In some examples, the predetermined amount of time may comprise a curing time for the adhesive. If, at 902, one or more human user determine that the housing 100 has been compressed for the predetermined amount of time (Step 902—Yes), the fixture is opened and the housing 100 is removed from the welding fixture 700, at 904. As mentioned previously, once the housing 100 is removed from the welding fixture 700, the end plate 104 and 116 maintain a compressive load on at least the battery cells 102 and the compressive material 136 of the housing. Furthermore, the end plate 104 and 116 may also apply a compressive load on the side plates 120 and 126. The compressive load applied by the end plates 104 and 116 on various components of the housing 100 may include a force between approximately 0.5 kN and approximately 9 kN, between approximately 1.5 kN and approximately 7.5 kN, or between approximately 2 kN and approximately 6 kN.

INDUSTRIAL APPLICABILITY

This disclosure generally relates to a housing for a battery module including a number of battery cells secured within the housing. The housing described herein is used to house a battery module that is used in mobile machines. As such, the battery modules and the housing will be subject to various loading forces. Such loading forces are often greater than typical loading forces seen in other applications due to the uneven and undeveloped surfaces on which the machines operate. Furthermore, the machines undergo many acceleration and deceleration events as well as events using an implement (e.g., scoop, bucket, blade, etc.) during operation of the machine. The housing described herein provides a strengthened housing that is capable of securing battery cells therein such that the housing and the battery cells are capable of withstanding vibration, shock, and other loading forces. Furthermore, the housing described herein is formed without fasteners (e.g., bolts, rivets, etc.) and, therefore, maximizes space within the housing to secure battery cells therein.

According to some embodiments, a housing 100 includes a first end plate 104, a second end plate 116, a first side plate 120, and a second side plate 126 coupled to one another, thereby forming an exterior perimeter 130 of the housing. The housing 100 further includes a center plate 110 extending between the first end plate 104 and the second end plate 116 such that the center plate 110 bisects the housing 100, thereby forming a first housing portion 132 and a second housing portion 134. One or more battery cells 102 are secured within the first housing portion 132 and the second housing portion 134, respectively. The plurality of battery cells 102 are coupled to the center plate 110 via a compressible material 136 and an adhesive. The plurality of battery cells 102 are also coupled to the first end plate 104, the second end plate 116, the first side plate 120, and the second side plate 126 via the compressible material 136 and the adhesive, thereby eliminating the need for fasteners to secure the battery cells 102 within the housing.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A housing, comprising:
   a first end plate defining a first end of the housing;
   a second end plate defining a second end of the housing opposite the first end;
   a first side plate coupled to the first end plate and the second end plate, thereby defining a first side of the housing, the first side plate extending substantially perpendicular to the first end plate and the second end plate;
   a second side plate coupled to the first end plate and the second end plate, thereby defining a second side of the housing opposite the first side, the second side plate extending substantially parallel to the first side plate;
   a center plate coupled to the first end plate and the second end plate, the center plate including:
      a substantially planar first side facing the first side plate,
      a substantially planar second side opposite the first side of the center plate, and facing the second side plate,
      a top surface including at least one tab, and
      a bottom surface opposite the top surface of the center plate, the center plate being arranged within the housing such that a first plurality of battery cells within the housing are disposed in contact with the substantially planar first side of the center plate, and a second plurality of battery cells within the housing are disposed in contact with the substantially planar second side of the center plate;
   a back plate extending substantially perpendicular to the center plate and including an opening disposed substantially centrally along a length of the back plate, the opening extending from a top surface of the back plate, disposed internal to the housing, to a bottom surface of the back plate disposed external to the housing, wherein at least a portion of the bottom surface of the center plate is disposed within the opening of the back plate; and
   a cover removably attached to the housing and extending substantially parallel to the back plate, the cover having a top surface external to the housing, a bottom surface facing the back plate, and an opening positioned such that the at least one tab of the center plate passes through the opening of the cover and extends at least partially above the top surface of the cover.

2. The housing of claim 1, wherein a compressive force is applied to the first end plate towards the second end plate when the center plate is coupled to the first end plate and the second end plate.

3. The housing of claim 1, wherein the first side plate and the second side plate include corrugations that provide increased resistance to loading imparted on the first side plate and the second side plate.

4. The housing of claim 1, wherein the first end plate and the second end plate include cutouts therein through which one or more terminals protrude from within the housing to a location outside of the housing.

5. The housing of claim 1, wherein the center plate includes one or more tabs that extend above a height of the first end plate, the second end plate, the first side plate, and the second side plate.

6. The housing of claim 1, wherein the bottom surface of the center plate includes one or more notches disposed on one or more ends of the bottom surface, the notches being shaped such that the bottom surface of the center plate is insertable into the opening in the back plate.

7. The housing of claim 1, wherein the back plate is a cooling plate that transfers heat from the housing to an environment surrounding the housing, the cooling plate including one or more channels therein.

8. The housing of claim 1, wherein the bottom surface of the center plate includes a cutout therein and the back plate is coupled to the center plate via a clip mating with the cutout.

9. A battery module, comprising:
   a housing, including:
      a first end plate defining a first end of the housing, the first end plate including a slit centered along a length of the first end plate;
      a second end plate defining a second end of the housing opposite the first end;
      a first side plate coupled to the first end plate and the second end plate, thereby defining a first side of the housing, the first side plate extending substantially perpendicular to the first end plate and the second end plate;
      a second side plate coupled to the first end plate and the second end plate, thereby defining a second side of the housing opposite the first side, the second side plate extending substantially parallel to the first side plate;
      a center plate mated with the slit and coupled to the first end plate and the second end plate, the center plate including:
         a substantially planar first side facing the first side plate,
         a substantially planar second side opposite the first side of the center plate, and facing the second side plate, and
         a bottom surface;
      a back plate including an opening disposed along a length of the back plate, the opening extending to a surface of the back plate disposed external to the housing, wherein at least portion of the bottom surface of the center plate is disposed within the opening;
      a cover removably attached to the housing and extending substantially parallel to the back plate, the cover having a top surface external to the housing, a bottom surface facing the back plate, and an opening, the center plate having a tab that passes through the opening of the cover and at least partially above the top surface of the cover, the tab being configured to support an additional housing disposed on top of the housing and adjacent to the top surface of the cover; and
   a plurality of battery cells secured within the housing.

10. The battery module of claim 9, wherein each of the individual battery cells of the plurality of battery cells are coupled to the center plate via an adhesive.

11. The battery module of claim 9, wherein a compressive force is applied to the first end plate towards the second end plate when the center plate is coupled to the first end plate and the second end plate.

12. The battery module of claim 9, wherein the center plate bisects the first end plate and the second end plate forming a first housing section and a second housing section, and the plurality of battery cells include a first plurality of battery cells secured within the first housing section and a second plurality of battery cells secured within the second housing section.

13. The battery module of claim 9, further comprising:
one or more busbars electrically coupled to the plurality of battery cells, thereby electrically connecting the plurality of battery cells; and
one or more flexible circuits coupled to the busbars and configured to determine a voltage or a current of the battery module.

14. The battery module of claim 9, wherein a compressible material is inserted between the individual battery cells of the plurality of battery cells and between the plurality of battery cells and the center plate.

15. The battery module of claim 9, wherein the bottom surface of the center plate includes a cutout therein and the back plate is coupled to the center plate via a clip mating with the cutout in the center plate, thereby securing the back plate to the center plate.

16. A method, comprising:
providing a plurality of plates configured to form an exterior perimeter of a housing, the plurality of plates including at least a first side plate, and a second side plate opposite the first side plate;
providing a center plate positioned to bisect the housing, thereby forming a first half and a second half of the housing, wherein the center plate includes:
a substantially planar first side facing the first side plate, and
a substantially planar second side opposite the first side of the center plate, and facing the second side plate;
providing a cover supported by the center plate and removably attached to the housing, the cover including a top surface external to the housing, a bottom surface opposite the top surface of the cover, and an opening extending from the top surface of the cover to the bottom surface of the cover;
providing a back plate including an opening disposed along a length of the back plate, the opening of the back plate extending to a surface of the back plate disposed external to the housing, wherein
the center plate is positioned such that at least portion of the bottom surface of the center plate is disposed within the opening of the back plate,
the cover is positioned such that the bottom surface of the cover faces the back plate, and
a tab of the center plate passes through the opening of the cover and at least partially above the top surface of the cover;
disposing a first plurality of battery cells within the first half of the housing;
disposing a second plurality of battery cells within the second half of the housing, wherein, when coupled together, the plurality of plates, the center plate, and the cover substantially enclose the first plurality of battery cells and the second plurality of battery cells within the housing;
compressing the housing such that a compressive force is exerted on the first end plate towards the second end plate;
coupling individual plates of the plurality of plates to each other; and
coupling the center plate to the first end plate and the second end plate.

17. The method of claim 16, further comprising:
inserting a compressible material between individual battery cells of the first plurality of battery cells and the second plurality of battery cells; and
inserting a compressible material between the first plurality of battery cells and individual plates of the plurality of plates and the center plate and between the second plurality of battery cells and the individual plates of the plurality of plates and the center plate.

18. The method of claim 17, further comprising coupling individual battery cells of the first plurality of battery cells and the second plurality of battery cells to the center plate.

19. The method of claim 18, further comprising:
coupling the first plurality of battery cells and the compressible material to the substantially planar first side of the center plate via an adhesive; and
coupling the second plurality of battery cells and the compressible material to the substantially planar second side of the center plate via the adhesive.

20. The method of claim 16, wherein coupling the individual plates to each other includes welding the individual plates to each other, and coupling the center plate to the first end plate and the second end plate includes welding the center plate to the first end plate and the second end plate.

21. The housing of claim 1, wherein the cover extends from the first end plate to the second end plate, and from the first side plate to the second side plate.

22. The housing of claim 21, wherein:
the opening of the back plate extends from proximate the first end plate to proximate the second end plate, and
the bottom surface of the cover comprises a substantially planar bottom surface opposite the top surface of the cover, the substantially planar bottom surface of the cover:
facing the first plurality of battery cells and the second plurality of battery cells, and
having a portion that is spaced from first plurality of battery cells and the second plurality of battery cells.

23. The housing of claim 22, wherein the at least one tab is separate from an electrical terminal of the housing electrically connected to the first and second pluralities of battery cells.

24. The housing of claim 23, wherein:
the housing comprises a first housing, and
the at least one tab is configured to support a second housing disposed on top of the first housing such that an additional back plate of the second housing extends from a first location above the first side plate to a second location above the second side plate, and is disposed adjacent to the top surface of the cover,
wherein the second housing is configured to store a third plurality of battery cells, substantially similar to the first plurality of battery cells, therein.

25. The housing of claim 22, wherein:
the back plate extends from the first end plate to the second end plate, and from the first side plate to the second side plate,
the first end plate extends along substantially an entire first side of the back plate and along substantially an entire first height of the first side plate, the second end plate extends along substantially an entire second side of the back plate and along substantially an entire second height of the first side plate, together, the cover, the back plate, the first end plate, the second end plate, the first side plate, and the second side plate substantially enclose the first plurality of battery cells and the second plurality of battery cells within the housing, and the center plate includes an additional tab that passes through the opening of the back plate.

\* \* \* \* \*